Oct. 23, 1945.     M. M. MARISIC     2,387,454
PROCESS FOR CONDUCTING CATALYTIC REACTIONS
Filed May 11, 1944

Inventor
Milton M. Marisic
By Oswald G. Hayes
Attorney

Patented Oct. 23, 1945

2,387,454

UNITED STATES PATENT OFFICE 2,387,454

PROCESS FOR CONDUCTING CATALYTIC REACTIONS

Milton M. Marisic, Woodbury, N. J., assignor to Socony-Vacuum Oil Company, Incorporated, a corporation of New York Application May 11, 1944, Serial No. 535,103

10 Claims. (Cl. 196—52)

This invention relates to a process and apparatus for conducting catalytic reactions and for regeneration of the catalyst wherein the heats of reaction during conversion and regeneration are of opposite sign. A typical example of such reactions is the catalytic cracking of heavy hydrocarbon oils to produce gasoline wherein the catalytic conversion is endothermic and deposits a carbonaceous contaminant which is periodically burned off with air thus liberating heat.

My prior copending application Serial No. 500,137, filed August 26, 1943, discloses a process of manufacturing siliceous hydrocarbon conversion catalysts from glasses, particularly compositions of alkali-boric oxide-silica glasses, by heat treating the glass to convert a major portion of the constituents other than silica into a soluble form, dissolving out the soluble portion and replacing in part the original soluble form with easily decomposable salts of beryllium, aluminum, titanium, zirconium, cerium, hafnium, tin, thorium, and the like; which on drying and heating react with the porous silica to form a plural oxide catalyst. It was mentioned therein that certain compositions of glass exhibit a swelling or shrinking on leaching the soluble phase and that this could be eliminated by extraction of the glass with acid solutions which may be regarded as comprising oxides which are to be reacted later with the glass, for example salts may often be regarded as made up of oxides, e. g. Al(NO$_3$)$_3$ is alumina plus oxides of nitrogen. The success of the present invention depends upon the preparation of siliceous catalysts described above in the form of unfractured tubes or plates. Hence, this invention is directed specifically to the utilization of leaching acids containing the above mentioned salts.

This invention pertains to a method of making siliceous hydrocarbon conversion catalysts and to a process of conducting hydrocarbon conversion reactions in the presence of a catalyst, while simultaneously regenerating another portion of the same catalyst and thereby furnishing the heat required in the hydrocarbon conversion.

In studying the catalysts of this invention it has been found that the hydrocarbon reactions or the regeneration reactions (burning coke from catalyst) proceed from the outer surface of the catalyst and gradually continue inwardly. This indicates that the hydrocarbon molecules which enter the catalyst surface do not permeate the whole thickness of the catalyst particle, but leave the catalyst by returning in the same direction as they entered. This may be observed visually in the oxidation of carbonaceous material from the catalyst. As the combustion proceeds there is at all times a visual line of demarcation of the depth of coke removed. At first, the whole catalyst is black, then a thin portion of the outer surface becomes transparent and the thickness of the transparent layer of catalyst continues to increase until all the coke is removed.

Other objects and advantages of my invention will be apparent from consideration of preferred embodiments thereof, apparatus for which is illustrated in the annexed drawing wherein.

Figure 1:
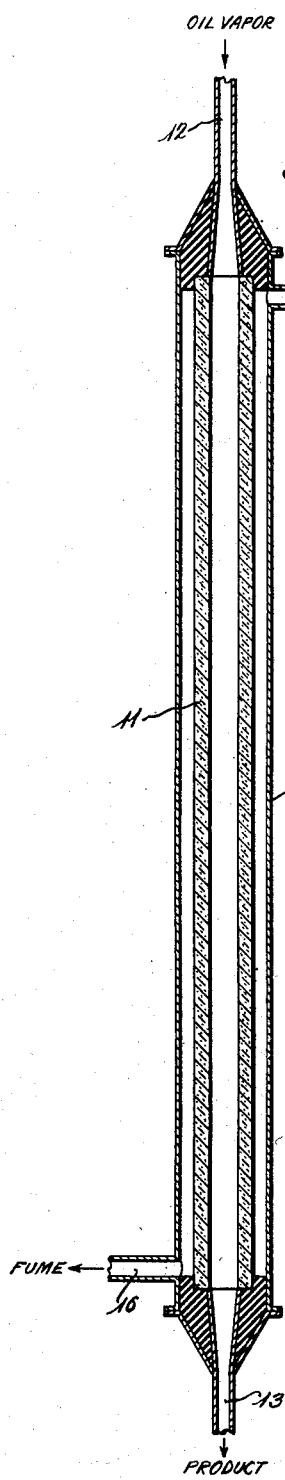
Figure 1 is a diagrammatic longitudinal cross-sectional view of one type of apparatus according to the invention.

In Figure 1 is shown a diagrammatic sketch of a suitable apparatus for practicing this invention. The catalyst which is in the form of a tube is designated as 11 in Figure 1. 12 and 13 are the inlet and outlet respectively, to the interior of the catalyst tube 11. 14 is an insulated jacket surrounding tube 11 having conduits 15 and 16, which communicate with the space surrounding the outer surface of tube 11.

Petroleum hydrocarbon vapors are preheated to the desired temperature and admitted to catalyst tube 11 at conduit 12. The converted hydrocarbons are withdrawn at conduit 13, while preheated air or flue gases are supplied at 15 and the products of combustion are withdrawn at 16. When one half of the thickness of catalyst tube 11 has been utilized in the hydrocarbon conversion reaction, the preheated charge hydrocarbons are diverted to conduit 15, while air is diverted to conduit 12. The converted hydrocarbons are withdrawn at conduit 16 and the regeneration gases are removed at 13. This process of interchanging the hydrocarbons and the regeneration gases is operated repeatedly in a cyclic manner. The time of each cycle is so adjusted that the hydrocarbon conversion reaction on either side of the catalyst tube does not permeate more than one half the thickness of the catalyst. It is to be understood that the regenerated portion of the catalyst is freed of oxygen according to conventional means prior to admission of hydrocarbon vapor; and similarly the spent portion of the catalyst is purged free of hydrocarbon vapor before regeneration with oxygen containing gases.

While only one catalyst tube is shown in Figure 1 for simplicity, it is to be understood that a plurality of such tubes may be utilized in one unit.

Instead of using catalyst tubes, a suitable apparatus for practicing this invention may be constructed by mounting a multiplicity of catalyst plates in a chamber.

Figure 2:
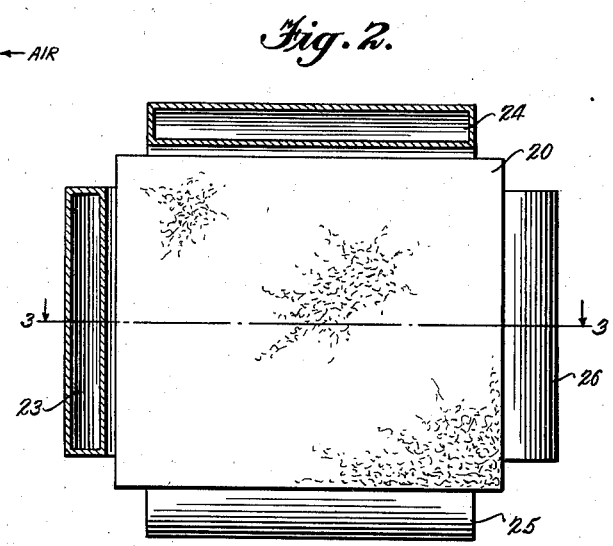
Figure 2 is an elevation of apparatus having greater capacity than that of Figure 1.
Figure 3:
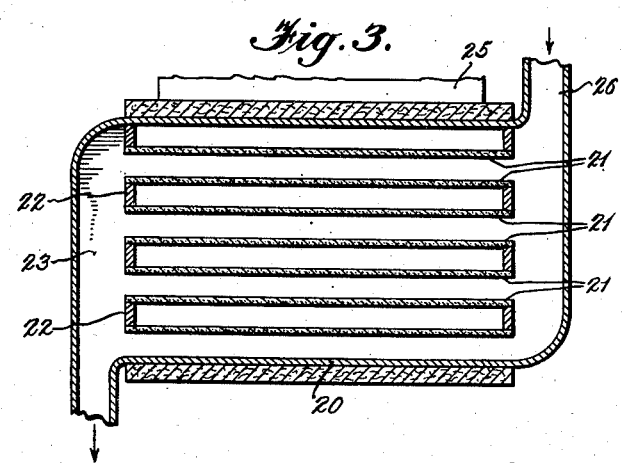
Figure 3 is a section on line 3—3 of Figure 2.

Such apparatus is shown in Figures 2 and 3. An insulated conversion chamber 20 is fitted with a plurality of plates 21 of cracking catalyst formed by reacting alumina on the pore surfaces of porous glass forming a plurality of flat parallel conversion zones each defined primarily by the porous glass catalyst. End plates 22 closing opposite edges of each catalyst zone are so positioned that alternate zones are adapted for flow at right angles to the flow of the adjacent zones. Thus Figure 3 would also serve as a section at right angles to line 3—3 if the zones shown open were closed by end plates 22 and those shown closed were open. It will be apparent that each plate of porous glass catalyst is the dividing wall between two zones adapted for flow paths at right angles to each other. Suitable headers 23 and 24 are provided for supplying fluid to the unit and headers 25 and 26 for withdrawal of fluids.

In operation of the apparatus shown in Figures 2 and 3, the general flow scheme is similar to that of the tubular chamber of Figure 1. Superheated hydrocarbon vapors are supplied by header 23 and cracked products withdrawn by header 26, while regeneration air is introduced at 24 and withdrawn at 25. After a suitable interval depending on the nature of the reactants and characteristics of the reaction, flow is stopped, the unit evacuated and the parallel zones are reversed as to function by feeding reactants at 24 and regeneration air at 23.

The process is exemplified by the following typical example of a catalytic cracking run, from which it will be clearly seen that the process is admirably suited to any process involving endothermic and exothermic reactions conducted in cyclic manner in contact with a porous solid.

A glass having the composition of 60% $SiO_2$, 30% $B_2O_3$ and 10% $Na_2O$ was prepared by fusion in the conventional manner and it was drawn into a tube three feet long having an internal diameter of 10 mm. and an outside diameter of 20 mm. This glass tube was heat treated for 35 hours at 1050° F., etched for 3 minutes with hot sodium hydroxide solution, and then leached with a one normal nitric acid solution nearly saturated with aluminum nitrate. Finally the leached glass tube was washed with 15% $Al(NO_3)_3.9H_2O$, dried at 180° F. and gradually heated to 1050° F. at which temperature it was maintained for five hours. This tube was mounted in the apparatus shown in Figure 1. A fraction of Oklahoma City gas oil having a boiling range of 470 to 708° F. was preheated to 800° F. and passed through the tube while heat was supplied to the outside of the tube for the initial run. When coke had been deposited to a depth of 2 mm. the oil was diverted to the outside of the tube while preheated air was passed through the inside of the catalyst tube to regenerate the catalyst and thus to furnish the heat required for the cracking reaction taking place on the other side of the catalyst tube. By the time the outer portion of the catalyst tube was coked to a depth of 2 mm. the inside of the tube was completely regenerated. Both sides of the catalyst tube were evacuated and then the oil and air streams were interchanged. This process was operated in a cyclic fashion to yield a 38% conversion of 400° F. endpoint gasoline based on the volume of oil charged.

I claim:

1. A process for conducting a series of alternate reactions in contact with a porous solid body on each side of which endothermic and exothermic reactions are alternately performed, the improvement which comprises conducting the exothermic reaction by contact of exothermic reactants with one side of a sheet of porous glass prepared by effecting phase separation of a glass and leaching out one of the separated phases; and simultaneously conducting the endothermic reaction by contact of endothermic reactants with the other side of said sheet of porous glass while inhibiting admixture of said endothermic and said exothermic reactants exterior to said sheet of porous glass.

2. A process for conducting a series of alternate reactions in contact with a porous solid body on each side of which endothermic and exothermic reactions are alternately performed, the improvement which comprises conducting the exothermic reaction by contact of exothermic reactants with the internal surface of a tube of porous glass prepared by effecting phase separation of a glass and leaching out one of the separated phases; and simultaneously conducting the endothermic reaction by contact of endothermic reactants with the external surface of said tube of porous glass while inhibiting admixture of said endothermic and said exothermic reactants exterior to said tube of porous glass.

3. A process for conducting a series of alternate reactions in contact with a porous solid body on each side of which endothermic and exothermic reactions are alternately performed, the improvement which comprises conducting the exothermic reaction by contact of exothermic reactants with one side of a sheet of porous glass prepared by heating an alkali boro-silicate glass to effect separation thereof into phases relatively poor in silica and relatively rich in silica and leaching out the phase relatively poor in silica with dilute acid; and simultaneously conducting the endothermic reaction by contact of endothermic reactants with the other side of said sheet of porous glass while inhibiting admixture of said endothermic and said exothermic reactants exterior to said sheet of porous glass.

4. A process for conducting a series of alternate reactions in contact with a porous solid body on each side of which endothermic and exothermic reactions are alternately performed, the improvement which comprises conducting the exothermic reaction by contact of exothermic reactants with the internal surface of a tube of porous glass prepared by heating an alkali boro-silicate glass to effect separation thereof into phases relatively poor in silica and relatively rich in silica and leaching out the phase relatively poor in silica with dilute acid; and simultaneously conducting the endothermic reaction by contact of endothermic reactants with the external surface of said tube of porous glass while inhibiting admixture of said endothermic and said exothermic reactants exterior to said tube of porous glass.

5. A process for the catalytic cracking of hydrocarbon oils and regeneration of the catalyst which comprises contacting hydrocarbon vapors with one side of a sheet of porous glass prepared by heating an alkali boro-silicate glass to effect separation thereof into a phase relatively poor in silica and a phase relatively rich in silica, leaching out the phase relatively poor in silica and reacting alumina with the pore surfaces of the resultant porous glass; and simultaneously contacting an oxidizing gas with the other side of said sheet of porous glass to burn off carbonaceous matter thereon.

6. A process for conducting a series of alternate reactions in contact with a porous solid body on each side of which endothermic and exothermic reactions are alternately performed, the improvement which comprises conducting the exothermic reaction by contact of exothermic reactants with one side of a sheet of porous glass prepared by effecting phase separation of a glass and leaching out one of the separated phases; and simultaneously conducting the endothermic reaction by contact of endothermic reactants with the other side of said sheet of porous glass while inhibiting admixture of said endothermic and said exothermic reactants exterior to said sheet of porous glass, continuing said contacting as aforesaid for a predetermined period, thereafter removing said reactants from contact with said porous glass and reversing the order of the contacting steps to contact endothermic reactants with said first mentioned side and to contact exothermic reactants with said other side.

7. A process for conducting a series of alternate reactions in contact with a porous solid body on each side of which endothermic and exothermic reactions are alternately performed, the improvement which comprises conducting the exothermic reaction by contact of exothermic reactants with the internal surface of a tube of porous glass prepared by effecting phase separation of a glass and leaching out one of the separated phases; and simultaneously conducting the endothermic reaction by contact of endothermic reactants with the external surface of said tube of porous glass while inhibiting admixture of said endothermic and said exothermic reactants exterior to said tube of porous glass, continuing said contacting as aforesaid for a predetermined period, thereafter removing said reactants from contact wtih said porous glass and reversing the order of the contacting steps to contact endothermic reactants with said first mentioned side and to contact exothermic reactants with said other side.

8. A process for conducting a series of alternate reactions in contact with a porous solid body on each side of which endothermic and exothermic reactions are alternately performed, the improvement which comprises conducting the exothermic reaction by contact of exothermic reactants with one side of a sheet of porous glass prepared by heating an alkali boro-silicate glass to effect separation thereof into phases relatively poor in silica and relatively rich in silica, and leaching out the phase relatively poor in silica with dilute acid; and simultaneously conducting the endothermic reaction by contact of endothermic reactants with the other side of said sheet of porous glass while inhibiting admixture of said endothermic and said exothermic reactants exterior to said sheet of porous glass, continuing said contacting as aforesaid for a predetermined period, thereafter removing said reactants from contact with said porous glass and reversing the order of the contacting steps to contact endothermic reactants with said first mentioned side and to contact exothermic reactants with said other side.

9. A process for conducting a series of alternate reactions in contact with a porous solid body on each side of which endothermic and exothermic reactions are alternately performed, the improvement which comprises conducting the exothermic reaction by contact of exothermic reactants with the internal surface of a tube of porous glass prepared by heating an alkali boro-silicate glass to effect separation thereof into phases relatively poor in silica and relatively rich in silica and leaching out the phase relatively poor in silica with dilute acid; and simultaneously conducting the endothermic reaction by contact of endothermic reactants with the external surface of said tube of porous glass while inhibiting admixture of said endothermic and said exothermic reactants exterior to said tube of porous glass, continuing said contacting as aforesaid for a predetermined period, thereafter removing said reactants from contact with said porous glass and reversing the order of the contacting steps to contact endothermic reactants with said first mentioned side and to contact exothermic reactants with said other side.

10. A process for the catalytic cracking of hydrocarbon oils and regeneration of the catalyst which comprises contacting hydrocarbon vapors with one side of a sheet of porous glass prepared by heating an alkali boro-silicate glass to effect separation thereof into a phase relatively poor in silica and a phase relatively rich in silica, leaching out the phase relatively poor in silica and reacting alumina with the pore surfaces of the resultant porous glass; and simultaneously contacting an oxidizing gas with the other side of said sheet of porous glass to burn off carbonaceous matter thereon, continuing said contacting as aforesaid for a predetermined period, thereafter removing said vapors and said oxidizing gas from contact with said porous glass and reversing the order of the contacting steps to contact said oxidizing gas wtih said first mentioned side and to contact hydrocarbon vapors with said other side.

MILTON M. MARISIC.